United States Patent [19]

Jones

[11] 3,967,431
[45] July 6, 1976

[54] SHEAR PLATES
[76] Inventor: Thomas W. Jones, Buckhorn Lake, Unadilla, N.Y. 13849
[22] Filed: July 10, 1975
[21] Appl. No.: 594,720

[52] U.S. Cl. .............................. 52/753 L; 85/50 R; 85/11
[51] Int. Cl.² ............................................ F16B 7/00
[58] Field of Search .......... 52/753 L, 753 R, 753 C, 52/753 D; 85/50 R, 11

[56] References Cited
UNITED STATES PATENTS

| 1,028,290 | 6/1912 | Sessions | 85/50 R |
| 3,170,365 | 2/1965 | Vaughn | 85/50 R |

Primary Examiner—Wayne L. Shedd
Attorney, Agent, or Firm—Richard G. Stephens

[57] ABSTRACT

Shear plates for connecting wooden members comprise a stamped circular piece of metal sheet having an outer flange and a central hub. A circular washer is swaged into the hub.

12 Claims, 10 Drawing Figures

SHEAR PLATES

My invention relates to shear plates for use in connecting wooden beams and the like, and more particularly to an improved shear plate device, and a method of making the same. A wide variety of structural building members are commonly formed of layers of wooden boards glued together, to form arches, trusses, beams and the like. While such laminated wood members may be readily constructed with strengths equal to exceeding those of equivalent structural steel members such as I-beams, a principal problem attending the use of laminated wood members in many applications is that of securely connecting such members together, or to other building members. In fact, the problem is not limited to laminated wood members, but also occurs in the use of solid-sawn wood members. In very simple, light-load applications, two wooden members may be interconnected merely by use of one or more bolts which pass through one or more holes drilled through a pair of such members. Where heavier loading is involved, such a technique becomes unacceptable or uneconomical and loading may cause the bolts to deform or split the holes through the wood members unless bolts of an impractically large diameter are used. To avoid the use of bolts of such diameter, the art generally has adopted the use of malleable cast-iron shear plates which are inset into the wooden members to transmit shear forces to and from the members. While malleable cast iron shear plates commonly used in the industry have been largely satisfactory for securely connecting the wood members, they have been expensive, and time-consuming to manufacture. A principal object of the present invention is to provide improved shear plates which may be manufactured substantially less expensively, and more rapidly.

The prior art has uniformly tended to use malleable cast-iron shear plates for high-load applications. Malleability insures that the plates are unlikely to develop cracks during handling and installation. This is important because cracks conceivably could lead to a building collapse, with much damage and even loss of life. However, to provide malleability, the plates must be cooled very slowly after being cast, which limits production and adds to its expense. The requirement that a cast shear plate be malleable is further disadvantageous because it imposes either a further risk or additional testing. Whether a cast iron shear is malleable, or instead unacceptably brittle, is not readily determined by visual inspection. Thus some danger exists that a cast iron shear plate which was not cooled slowly enough could be used, and that it might fail. While I am not personally aware that any building member has failed for such a reason, it is apparent that some finite possibility of such a failure exists. Another object of the invention is to provide an improved form of shear plate, and a method for the making of the same, which obviates such a problem.

It is well known throughout civil engineering that when a pair of structural members are tied together by plural, identical fastening devices, whether they be bolts or rivets, or other types of fasteners, the overall strength of the total interconnection cannot be determined by merely multiplying the load-carrying strength of one such fastener by the member fasteners used, and that a lesser overall strength must be assumed, principally because each of the plural fasteners is not likely to receive exactly the same share of the total load. Preliminary tests conducted with the present invention appear to indicate that some equalizing of the total load results with use of the improved shear plate, and thus another object of the invention is to provide a shear plate having such an advantage.

In the use of laminated wood or solid sawn wooden building members, interconnections are frequently required between pairs of wooden members, and other interconnections are required between wooden members and steel members, such as I-beams or steel side plates, or between wooden members and concrete or other members. The presently used malleable cast iron shear plates may be used for any of these different classes of connections. Another object of the present invention is to provide an improved shear plate which may also be used for any of these different classes of connections, as well as having the previously-mentioned advantages.

Other objects of the invention will in part be obvious and will in part appear hereinafter.

The invention accordingly comprises the features of construction, combination of elements, and arrangement of parts, which will be exemplified in the construction hereinafter set forth, and the scope of the invention will be indicated in the claims.

For a fuller understanding of the nature and objects of the invention reference should be had to the following detailed description taken in connection with the accompanying drawings, in which.

Figure 3B:
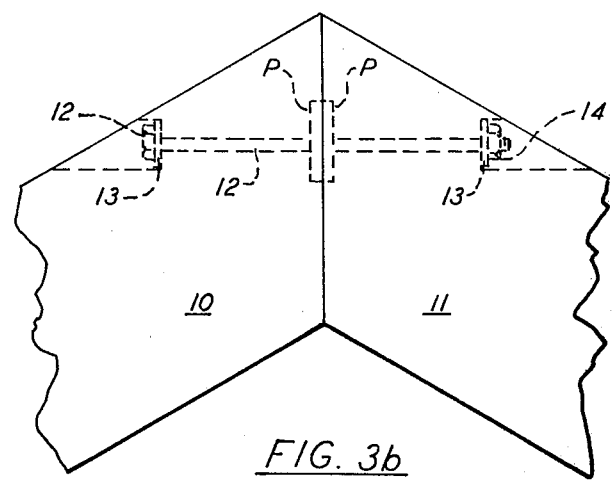
FIGS. 3a and 3b are top and side views illustrating one manner in which shear plates are used to interconnect a pair of wooden structural members.
Figure 3A:
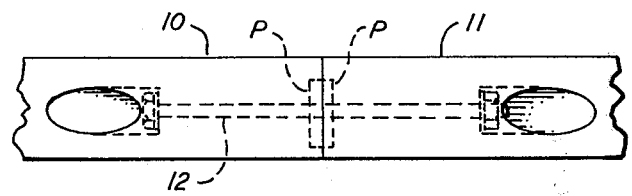

In FIGS. 3a and 3b a pair of laminated wooden arch members 10, 11 are shown extending generally upwardly and abutting each other, where they are interconnected. Arches of this general nature are widely used to support roof decking (not shown) of various churches, school auditoriums, gymnasiums and the like. Holes drilled through the members accommodate a bolt 12, which clamps the members together with the aid of washers 13, 13 and a nut 14. If wind or other loading is applied to such a pair of members, it will be apparent that one member will tend to move vertically relative to the other member, applying shear force to bolt 12. If bolt 12 had quite a modest diameter, and if the shear plates shown at P,P were not used, the bolt would communicate the shear force to small areas of wood, with large force per unit area, so that the forces would tend to crush the wood surrounding the bolt holes, enlarging the holes to provide some "play" in the connection, with the bolt even possibly slicing through or splitting the wood to cause total failure of the connection. It was long ago recognized that such problems could be avoided by use of bolts of substantially increased diameter, but the provision of such bolts of adequate diameter is very expensive. It was also recognized at an early date that far less expensive bolts having a reasonable diameter (and adequate tensile strength) could be used if shear forces were instead transmitted to each wooden member via a respective shear plate, such as those shown at P,P in FIGS. 3a and 3b. Each shear plate acts to distribute shear force over a much greater area of wood than the bolt 12 alone would, thus preventing enlargement of the holes through the members and resultant play in the connection.

Figure 4A:
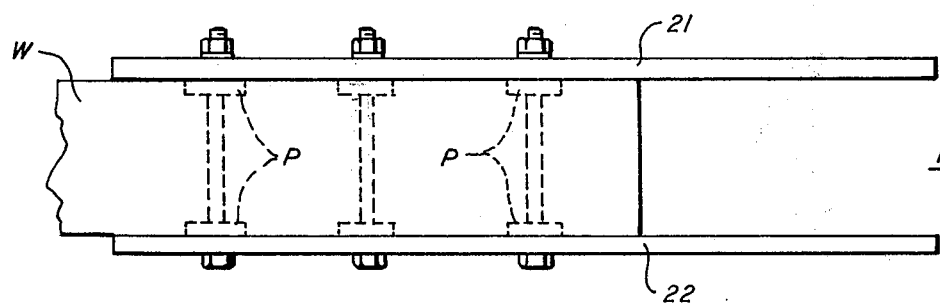
FIGS. 4a and 4b are top and side views illustrating a typical manner in which shear plates are used to connect a wooden member to a metal structural member.
Figure 4B:
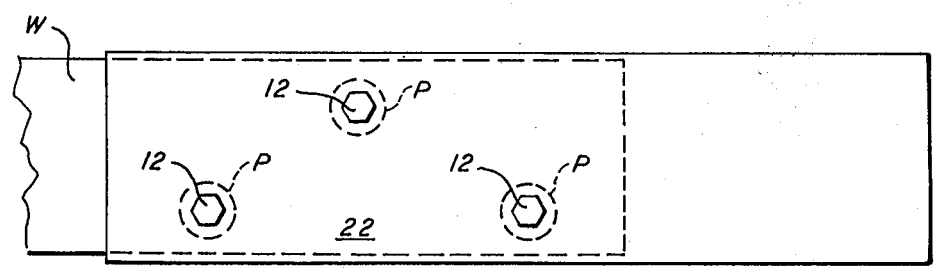

In FIGS. 4a and 4b, a wooden member W is alternatively shown clamped between a pair of metal plates 21,22 by a plurality of bolts 12,12 and a plurality of shear plates P,P inset into member W on opposite sides. It will be apparent that metal plates 21,22 may be connected to other building structure in a variety of different ways, such as by bolting, welding, or even the use of rivets.

Figures 5A, 5B, 5C:
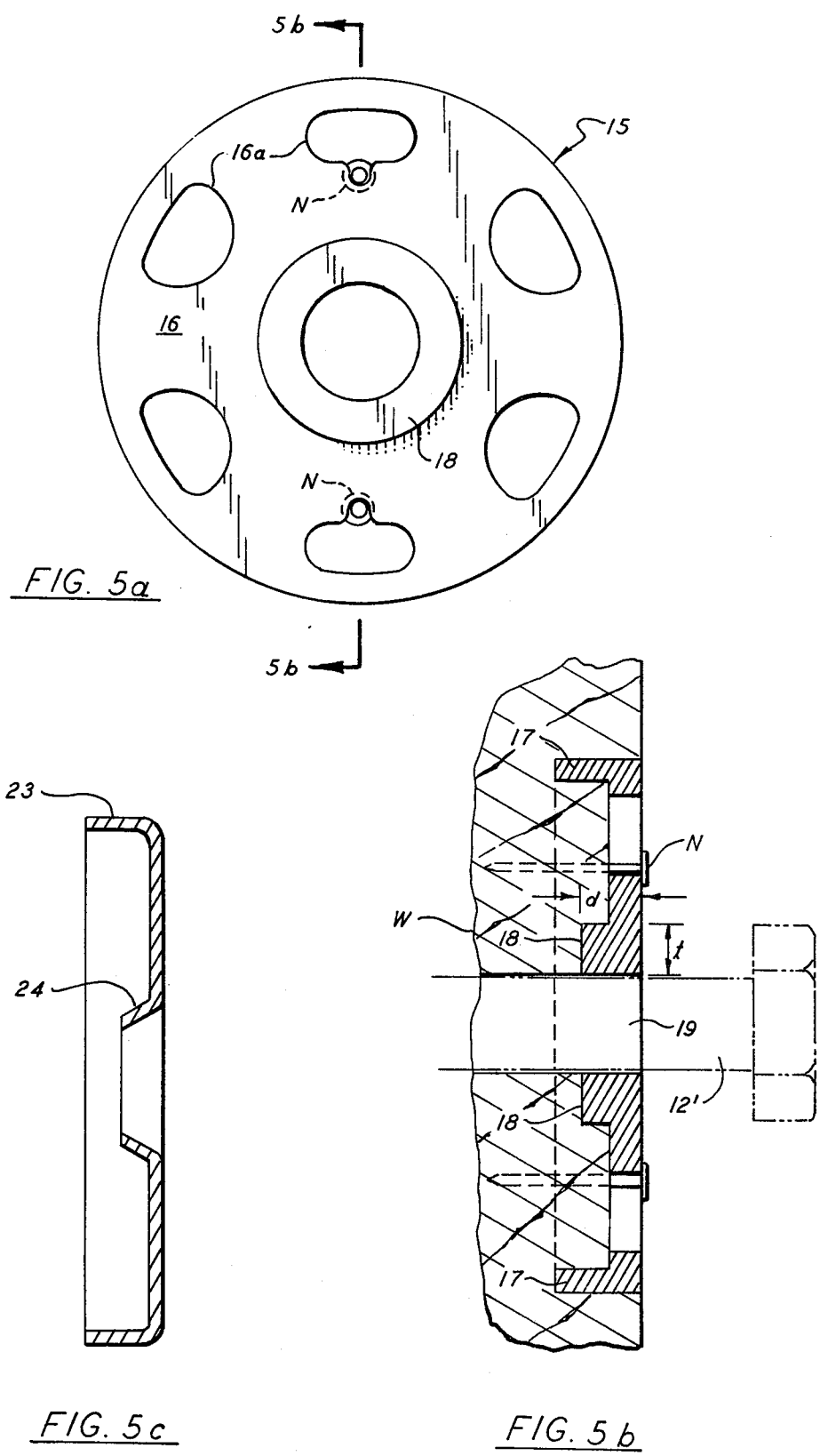
FIGS. 5a and 5b are side and cross-section views illustrating one form of prior art shear plate.
FIG. 5c is a cross section view illustrating another form of prior art shear plate.

FIG. 5b illustrates in cross-section a widely used form of malleable cast iron shear plate 15 situated in a mating recess provided in a wooden member W. This shear plate, which is cast in one piece, will be seen to comprise a generally flat circular plate or back portion 16 having an annular outer flange 17, and a central annular hub 18 having a through bore 19. A plurality of holes 16a,16a through the shear plate perform no function while the shear plate is in use, and are provided merely to simplify casting, using less metal. To install the device of FIG. 5a in the member W, a circular recess having a diameter corresponding to the outside diameter of the shear plate, and having a bottom profile corresponding to the left side (in FIG. 5b) profile of the shear plate, is cut in the wooden member W, using a rotary cutter of appropriate shape, and then shear plate 15 is press-fitted into the recess, ordinarily with several hammer blows. Wood then essentially "fills" the shear plate, contacting the inner as well as the outer side of flange 17, the annular periphery and end of the hub portion 18, and backplate portions of the shear plate radially in between the hub and the flange, securely locating the shear plate on the wooden member. Several nails such as those shown in phantom at N,N are commonly driven through several holes in the plate into the wood, merely to insure that the plate is not lost during handling and erection of the wooden member. A bolt, such as that shown in phantom at 12', passes through bore 19 in the hub portion of the shear plate. It will be seen that the entire shear force transmitted between the bolt and shear plate 15 is transmitted to the central hub, and that the force per unit area of bolt-to-shear plate contact depends directly upon the width (dimension $d$ in FIG. 5b) of the hub. If the hub width were markedly decreased in FIG. 5b, it will be appreciated that very large stresses would be imposed where the bolt contacted the shear plate, tending to crack or crush the hub area of the shear plate. For that reason, the width $d$ must be maintained adequately large. Similarly, it will be apparent that the thickness (dimension $t$ in FIG. 5b) of the hub must be adequate, or else forces from the bolt would fracture the hub. However, providing adequate width and thickness dimensions for the cast hub of FIG. 5a and 5b poses no problem, as it is a simple matter of providing the desired dimensions in a mold.

When cast shear plates of the type shown in FIG. 5a are used, either for connections of the nature of FIGS. 3a and 3b, or for connections of the nature of FIGS. 4a and 4b, it is necessary that the diameter of the central bore 19 conform quite closely (e.g. within one-sixteenth inch) to the outside diameter of the bolt passing therethrough, to minimize the "play" which otherwise would occur in the connection. This tends to require either careful casting procedures or that the central bore of cast shear plates be reamed after casting and cooling, which adds significantly to the cost of such shear plates. Because of the mentioned disadvantages of cast shear plates, various alternative types of shear plate have been sought for some years. One prior attempt to overcome the disadvantages of the cast shear plates of FIGS. 5a and 5b is shown in FIG. 5c as comprising a one-piece shear plate which was stamped from a metal sheet, and formed with an outer flange 23 and a central hub 24, using a punch press. The use of stamping allows shear plates of the type shown in FIG. 5c to be manufactured far more economically and rapidly than the cast-iron shear plates, and stamped and formed shear plates of the type shown in FIG. 5c are entirely suitable for some applications. However, in those applications where large shear loads are encountered, the device of FIG. 5c becomes entirely inadequate. While its outer flange 23 may transmit force to the wooden member without trouble, the central hub portion tends to be deformed by the forces imposed against it by the bolt. It is important to recognize that the thickness and width of the central hub portion are inherently limited by the thickness of the sheet from which the device is stamped. Given a circular plate of a given thickness, there is only so much metal which may be pushed from the center by the press to form a hub having a given size central bore. Initially one might think one could use more metal to form the hub by providing a larger central bore, but then one must use larger diameter bolts, thereby defeating the very purpose of using a shear plate. Theoretically, one could provide a central hub of adequate strength by stamping and forming from a thicker metal sheet. However, that strategm requires the use of a substantially larger punch press, and more expensive and/or more wearable punching and forming dies, as well as the use of more metal. Problems of this nature have discouraged many prior efforts to decrease the cost of shear plates, so that despite their mentioned disadvantages, the cast iron plates of FIG. 5a have been the most popular in the industry.

Figure 1:
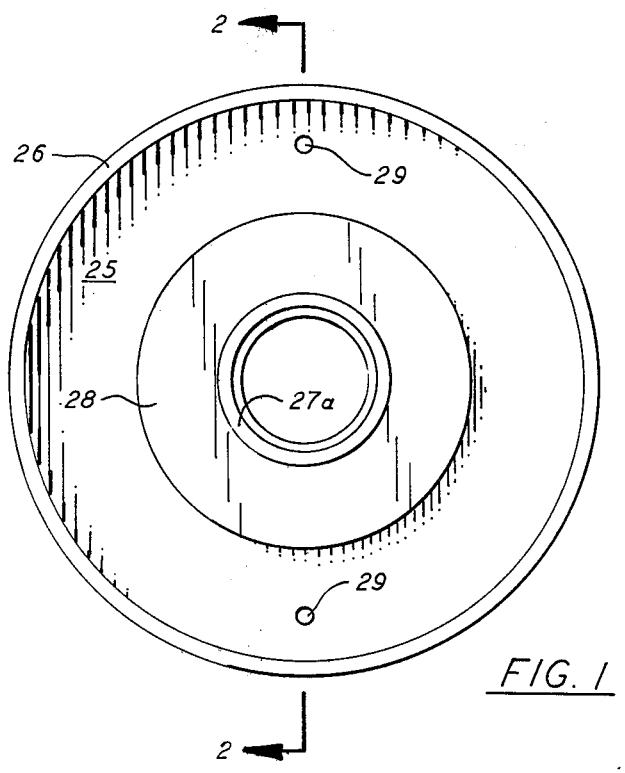
FIG. 1 is a side view of a preferred form of shear plate constructed with the present invention.
Figure 2A:
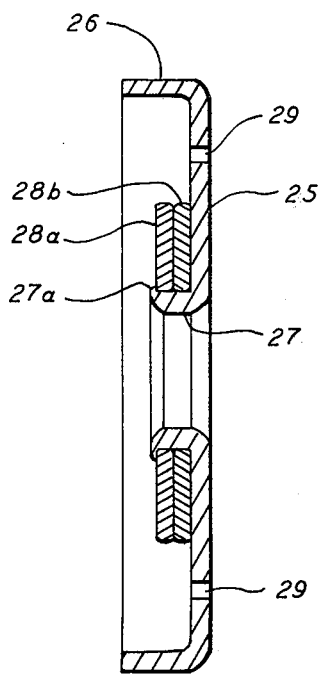
FIG. 2a is a view similar to FIG. 2 of one modified form of shear plate according to the invention.
Figure 2:
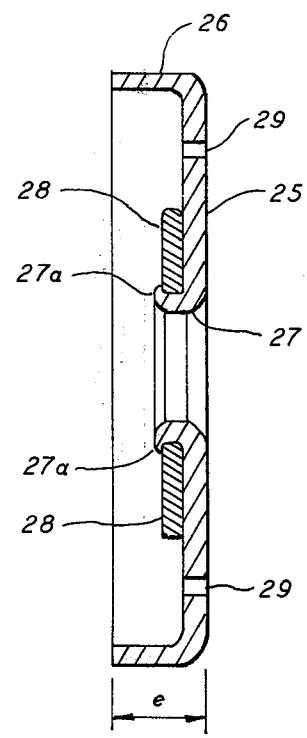
FIG. 2 is a cross-section view taken at lines 2—2 in FIG. 1.

In accordance with the present invention, an improved shear plate is made in accordance with FIGS. 1 and 2. The device thereshown includes an integral stamped piece substantially identical to the device of FIG. 5c, comprising a generally circular plate 25 having an annular outer flange 26 and a central hub portion 27, both of which are rapidly and inexpensively formed using a conventional press with forming dies. However, in order to provide a central hub portion of adequate strength, a washer or ring 28 is provided to tightly surround the hub 27 and to seat against the plate portion 25. The ring 28 itself may comprise an inexpensive stamping. Both pieces of the device may be stamped from the same sheet stock, which typically may comprise mild low-carbon steel sheet. Ring or washer 28 is preferably swaged onto hub portion 27, and the outer end of the hub then slightly expanded or flared, as shown at 27a, to lock the ring on the hub, with the hub seated against the plate portion 25. It will be apparent that all the operations required to produce the device may be rapidly and economically performed using a conventional punch press. Those skilled in the metalworking arts will readily recognize that stamping and forming of the flange and hub may be performed either with separate successive strokes of a punch press, or done simultaneously with some presses.

It is not strictly necessary that the end of the hub be expanded to lock on the washer or ring. The ring could instead be retained on the hub by tack welding, or even gluing, or even by mere friction, but I prefer that the ring be swaged on, since it may be easily accomplished using the same press used to perform the other operations. It is not necessary that ring 28 be retained on the hub with any great degree of force but tightly enough that the ring and hub act together as a unitary structure.

One successful embodiment of the invention was formed from steel sheet 0.125 inch thick to provide a finished shear plate 4.02 inches in diameter, with a depth (dimension $e$ in FIG. 2) of 0.62 inch, with the ring or washer having an outer diameter of 2.25 inches, an inner diameter of 1.0 inch and a thickness of 0.15 inch. The bore through the central hub was 0.81 inch in diameter, to accommodate a bolt approximately ¾ inch in diameter. A shear test conducted in the civil engineering department at Cornell University on a connection of substantially the type shown in FIGS. 4a,4b, where 8 shear plates were used, indicated no damage to the shear plates under loading of 91,500 pounds, or more than 11,430 pounds per shear plate, a loading at which the wood member itself split and failed. Inasmuch as the normal design standard for maximum loading of a single shear plate of that diameter is about 4,900 pounds, it will be apparent that the device of FIGS. 1 and 2 eminently satisfactory. The improved shear plate is installed in wooden members in the same manner as was described for the prior art cast iron shear plate, and several holes are preferably provided as shown at 29,29 in FIG. 1, so that the device may be nailed into the mating recess provided in the wooden member.

While sufficient test data has not yet been accumulated to thoroughly establish the point, it is believed that the web or back portions of the shear plates of the present invention also slightly compress or deflect under heavy loading, to provide a highly desirable equalizing of forces between the various shear plates, thereby materially increasing the strength of the connection.

It should be recognized that the dimensions given for the specific forms of the device disclosed herein are exemplary only.

While the ring or washer surrounding the central hub may have the same thickness as the other piece of the shear plate, it is not necessary that it be the same. Also, more than one ring can be fitted onto the hub, as indicated in FIG. 2a, wherein two rings 28a and 28b are shown installed.

It will thus be seen that the objects set forth above, among those made apparent from the preceding description, are efficiently attained, and since certain changes may be made in the above constructions without departing from the scope of the invention, it is intended that all matter contained in the above description or shown in the accompanying drawings shall be interpreted as illustrative and not in a limiting sense.

The embodiments of the invention in which an exclusive property or privilege is claimed are defined as follows:

1. A structural interconnection between a bolt and a wooden member, comprising, in combination: an annular piece of metal having an annular flange seated within a recess within said wooden member and an annular central hub having a central opening, and a metal ring surrounding said hub, said hub and said ring being seated within a recess in said wooden member, said wooden member having a bore aligned with said central opening in said hub, and a bolt extending through said central opening and said bore.

2. An interconnection according to claim 1 wherein said hub extends through an opening in said metal ring and the end of said hub is flared to lock said ring on said hub.

3. An interconnection according to claim 1 wherein said metal ring has a circular outer periphery.

4. An interconnection according to claim 1 wherein said metal ring is seated against a flat portion of said piece of metal surrounding said hub.

5. A shear plate adapted to seat within an annular recess which surrounds a bolt hole in a wooden member to transmit shear forces between said wooden member and a bolt which extends through said bolt hole, comprising, in combination: a piece of metal sheet including an end wall portion and a peripheral annular flange formed thereon, said end wall portion and said annular flange defining a generally cylindrical space within which said wooden member may fittedly extend with said flange seating in said annular recess in said wooden member, said end wall having a central opening and a hub portion surrounding said central opening being formed in said end wall to extend within said cylindrical space; and a metal ring having a central opening, said hub portion being fitted into said central opening of said metal ring.

6. A shear plate according to claim 5 wherein said metal ring has a circular outer periphery.

7. A shear plate according to claim 5 wherein said metal ring comprises a flat ring seated against said end wall.

8. A shear plate according to claim 5 wherein said peripheral annular flange has an axial length exceeding the axial length of said hub portion.

9. A shear plate according to claim 5 wherein said peripheral annular flange, said central openings in said end wall and metal ring and said hub portion are all concentrically related to each other.

10. A shear plate according to claim 5 wherein the end of said hub portion extends through said central opening of said metal ring and is flared to lock said ring on said hub portion.

11. A shear plate according to claim 5 having at least one further opening through said end wall portion of said piece in between said hub-portion and said flange.

12. A shear plate according to claim 5 having a second metal ring having a central opening situated within said cylindrical space with said hub fitted into said central opening of said second ring.

* * * * *